(12) United States Patent
Pilling et al.

(10) Patent No.: US 7,708,258 B2
(45) Date of Patent: May 4, 2010

(54) TRAY FOR A MASS EXCHANGE COLUMN

(75) Inventors: Mark W. Pilling, Jenks, OK (US);
Markus Fischer, Constance (DE); Dale Edward Nutter, Peralta, NM (US)

(73) Assignee: Sulzer Chemtech AG, Winterthur (CH)

( * ) Notice: Subject to any disclaimer, the term of this patent is extended or adjusted under 35 U.S.C. 154(b) by 722 days.

(21) Appl. No.: 11/644,386

(22) Filed: Dec. 21, 2006

(65) Prior Publication Data
US 2008/0150172 A1    Jun. 26, 2008

(51) Int. Cl.
*B01F 3/04* (2006.01)
(52) U.S. Cl. .................. 261/114.3; 261/114.4
(58) Field of Classification Search .............. 261/114.1, 261/114.2, 114.3, 114.4, 114.5
See application file for complete search history.

(56) References Cited

U.S. PATENT DOCUMENTS

| | | | | |
|---|---|---|---|---|
| 2,951,691 A | * | 9/1960 | Nutter | 261/114.3 |
| 3,056,592 A | * | 10/1962 | Thrift | 261/114.4 |
| 3,282,576 A | * | 11/1966 | Bruckert et al. | 261/114.3 |
| 3,729,179 A | * | 4/1973 | Keller | 261/114.1 |
| 4,101,610 A | * | 7/1978 | Kirkpatrick et al. | 261/110 |
| 4,118,446 A | | 10/1978 | Burin | |
| 4,275,021 A | * | 6/1981 | Kirkpatrick et al. | 261/114.3 |
| 4,750,975 A | | 6/1988 | Parker | |
| 5,106,556 A | * | 4/1992 | Binkley et al. | 261/114.1 |
| 5,277,847 A | * | 1/1994 | Gentry et al. | 261/114.1 |
| 5,360,583 A | | 11/1994 | Nutter | |
| 5,895,608 A | * | 4/1999 | Lee et al. | 261/114.1 |
| 6,189,872 B1 | * | 2/2001 | Chuang | 261/114.3 |
| 6,817,596 B2 | * | 11/2004 | Fischer | 261/114.1 |

FOREIGN PATENT DOCUMENTS

| | | |
|---|---|---|
| DE | 2 015 213 | 10/1971 |
| WO | WO 2004/071636 | 8/2004 |

* cited by examiner

*Primary Examiner*—Scott Bushey
(74) *Attorney, Agent, or Firm*—Francis C. Hand; Carella, Byrne, Cecchi

(57) ABSTRACT

The tray has an infusion field of infusion tab valves adjacent the inlet to dissipate the momentum of the liquid flowing across said infusion field. Each valve includes a vertically upstanding wall of a height to obstruct the flow of liquid and the valves are disposed in a staggered array. An adjacent bubbling area has openings for the passage of an ascending flow of vapor into contact with the liquid/vapor mixture flowing across the area. Each infusion tab valve may also have a push valve incorporated therein.

14 Claims, 3 Drawing Sheets

← Liquid Flow

Main Vapor Flow

TRAY FOR A MASS EXCHANGE COLUMN

This invention relates to a tray for a mass exchange column.

As is known, mass exchange columns, such as distillation columns, have been provided with various types of contact trays for vapor-liquid contact purposes. Examples of such columns are described in U.S. Pat. Nos. 4,750,975; 5,120,474 and 5,453,222.

Typically, the contact trays in a distillation column and the like have decks over which a flow of liquid passes from a downcomer located on one side of the tray to a downcomer located on an opposite side of the tray. In some cases, the decks are made with valves through which an ascending vapor may flow and over which the liquid may flow in order to bubble the vapor through the liquid. In other cases, a sieve tray is employed that simply has holes in the deck with no valves whatsoever. The sieve trays are popular because they are simple and inexpensive but they do not have an operating range as extensive as a valve tray.

As is known, the clear liquid entering at the inlet side of a tray is not easily aerated. Without correction, the vapor will preferentially enter into the liquid farther downstream. In order to maximize both capacity and efficiency, it is important that the vapor flow uniformly through the tray deck. In some cases, froth promoters in the form of an inlet side box that ran the chordal length of the tray have been used. However, this continuous raised device can create problems in fouling services since much of the heavy solids in the process stream become trapped upstream of the device. In other cases, use has been made of a baffle bar device to promote froth on tray decks. This device also has a continuous inlet weir than may possibly trap solids behind the device.

A tray is designed to contact liquid and vapor and then separate them again. Since the contact is supposed to be intimate, there are mixtures of vapor and liquid almost everywhere. In its simplest conceptual form, vapor flows up through a tray and contacts liquid. The two disengage and liquid flows downward through the downcomer and vapor flows up through the tray. In reality, trays can operate in a variety of flow regimes and there will be a variety of mixing between vapors and liquids. When a tray operates at relatively high pressures, there can be a vapor/liquid emulsion on the tray deck. This can flow into the downcomer and a substantial vapor can be carried down through the downcomer. When a tray is operating and loaded heavily, liquid entrains upward from the tray deck and flows through the holes with the vapor. Generally, 10% of the liquid can entrain upward without too big of a problem. When a tray is operating at low vapor rates, liquid can weep downward through the holes. When this happens, liquid usually goes down through some holes and vapor goes up through others.

Accordingly, it is an object of the invention to improve the capacity and efficiency of a tray for a mass exchange column.

It is another object of the invention to provide a simplified tray construction for promoting vapor-liquid contact in a distillation column.

Briefly, the invention provides a tray that is to be horizontally disposed in a column, such as a distillation column, for liquid-vapor contact.

The tray is constructed of circular shape although other shapes are also possible. In addition, the tray has an inlet on at least one side of the active area for receiving an inward flow of liquid for dispersion across the surface of the tray.

In addition, the tray has a first portion that defines a vapor infusion field adjacent to the inlet for receiving the flow of liquid. This first portion has a plurality of infusion tab valves that are disposed to dissipate the momentum of the liquid flowing across the infusion field.

Each infusion tab valve includes a horizontal floor of the tray, an opening in the floor and a vertically upstanding wall adjacent to the opening on a side closest to the inlet. This wall is of a height to obstruct the flow of liquid from the inlet across the floor. The wall may be of rectangular shape or of oval shape with the opening of a corresponding shape.

The tray also has a second portion adjacent to the infusion field for receiving the liquid flowing from the infusion field. This second portion has a plurality of openings for the passage of an ascending flow of vapor into contact with the liquid flowing across the second portion.

Still further, the tray has an outlet adjacent to the second portion and opposite the inlet for an outward flow of the liquid from the second portion.

The valves of the infusion field are disposed in two or three parallel rows with adjacent rows of the valves being disposed in stacked relation to each other in order to hydraulically obstruct the entire flow of liquid from the inlet. In this embodiment, each valve has a rectangular shaped opening disposed in parallel to the rectangular shaped opening of the other valves.

In another embodiment, the valves are arranged with rectangular shaped openings that are disposed at an angle to the rectangular shaped openings of other valves.

When placed in operation, liquid flows onto the floor of the tray from the inlet downcomer and flows across the infusion field. During this time, the flow of liquid is obstructed by the upstanding walls of the tab valves so that the momentum of the fluid is reduced and redirected in order to promote uniform mixing of the liquid with the ascending vapor on the remaining portion of the tray floor.

The advantage of the tray construction is the mechanical simplicity and the fouling resistance.

In another embodiment, each infusion tab valve may be provided with an infusion push valve. In this embodiment, the push valve is formed of a body that is moveably mounted in the infusion tab valve to move between a closed position resting on the floor of the tray and covering over the opening of the infusion tab valve and an open position spaced from the floor and the opening in order to allow an ascending flow of vapor through the opening.

The valve body includes a flat base, a pair of legs that depend from opposite sides of the base through the opening of the infusion tab valve and a pair of flaps that extend from opposite sides of the base for resting on the floor in a closed position. In addition, each leg has an outwardly extending foot for abutting an underside of the floor when in a fully open position so as to limit the upward movement of the valve body.

The flat base of the valve body may also have one or more orifices therein for the passage of the ascending vapor.

The depending legs of the push valve body serve to block off the opening of the tab valve in the tray floor to the flow of fluid and primarily block the vapor flow and direct the vapor forwardly.

During operation, the push valves will be closed at low rates of ascending vapor flow so as to provide only minimal froth promotion. At higher rates of vapor flow, the valves will open thereby providing froth injection and froth promotion in the liquid flowing across the deck.

One advantage of having infusion push valves on the inlet side of the tray is that these valves will open when the tray is heavily loaded. This should, in turn, minimize backmixing on the tray floor (i.e. the deck).

These and other objects and advantages of the invention will become more apparent from the following detailed description taken in conjunction with the accompanying drawings wherein.

Figure 1:
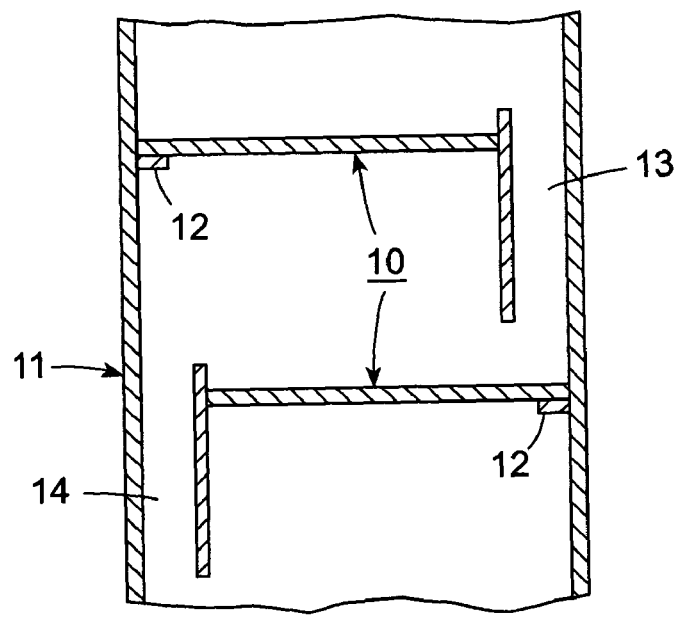
FIG. 1 illustrates a schematic view of a distillation tower employing a tray in accordance with the invention.

Referring to FIG. 1, the tray 10 is of a size for installation in a distillation column 11 or the like disposed on a vertical axis. The tray 10 is of circular shape and has a diameter of from 3 to 20 feet and may be from 12 inches to 50 feet.

The tray 10 is supported in the column 11 on a one to two inch width annular ring 12 that is fixedly mounted on an interior wall of the column 11 in spaced relation to other trays 10 that are disposed along the height of the column 1 in know manner.

A downcomer 13 is disposed in the column 11 to one side of the tray 10 for conveying a flow of liquid onto the tray 10 and a second downcomer 14 is disposed in the column 11 on an opposite side of the tray 10 for receiving liquid that flows across the tray 10 for delivery to a tray 10 therebelow. Alternatively, the tray 10 may be installed as a multi-pass tray (not shown) with flows from center, intermediate or side downcomers that alternate feed and that receive liquid from other downcomers.

Figure 2:
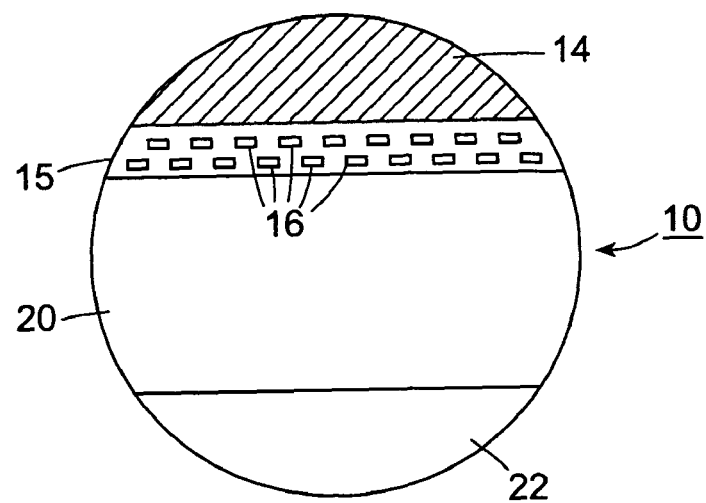
FIG. 2 illustrates a top view of a tray constructed in accordance with the invention.

Referring to FIG. 2, the tray 10 has a chordal inlet 14 for receiving an inward flow of liquid from the downcomer 13 and an infusion field 15 adjacent to the inlet for receiving the flow of liquid.

The infusion field 15 has a plurality of infusion tab valves 16 disposed therein to dissipate the momentum of the liquid flowing across the infusion field. As indicated, the infusion tab valves 16 are disposed in two parallel rows across the width of the infusion field 15 and an entire chordal region of the column 11.

Figure 3:
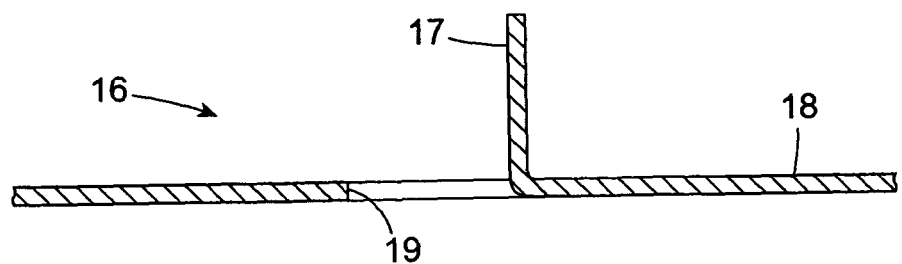
FIG. 3 illustrates a side view of an infusion tab valve in accordance with the invention.

Referring to FIGS. 2 and 3, each infusion tab valve 16 is formed by punching a tab 17, e.g. of rectangular shape, from the tray deck (floor) 18 without removing material. The tab 17 is essentially vertical, i.e. at a 90° angle to the deck 18, and aligned such that the tab 17 is upstream of the resulting orifice (opening) 19 to provide resistance to liquid flowing across the valve 16. Thus, each valve 16 includes a portion of the horizontal deck (floor)18, the orifice (opening) 19 in the deck (floor) 18 and the vertical upstanding tab (wall) 16 adjacent to the opening on the side closest to the inlet 14.

Figure 5:
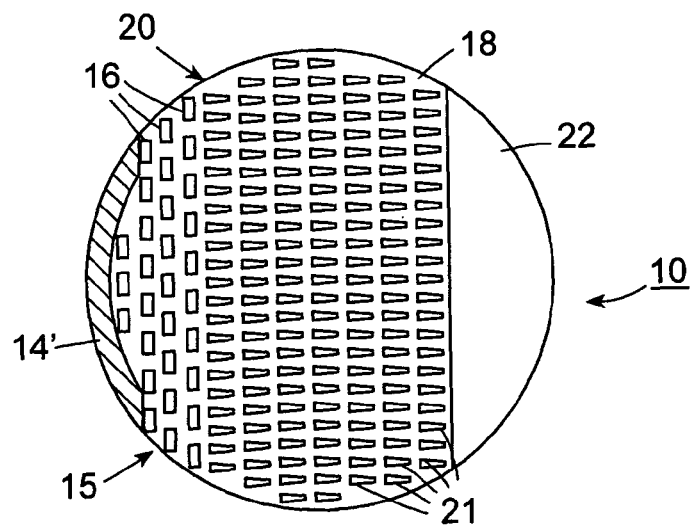
FIG. 5 illustrates a top view of a tray similar to the tray of FIG. 2 having openings for an ascending vapor in a bubbling area of the tray.

As shown in FIG. 2, the tray 10 has a normal bubbling area 20 in a portion adjacent to the infusion field 15 for receiving the liquid/vapor mixture flowing from the infusion field 15. As indicated in FIG. 5, this bubbling area 20 has a plurality of openings 21 for the passage of an ascending flow of vapor into contact with the liquid flowing across the bubbling area 20.

The tray 10 also has an outlet 22 adjacent to the bubbling area 20 for an outward flow of the liquid from the bubbling area 20.

The rows of infusion tab valves 16 are oriented on a triangular pitch and are located on the inlet side of the tray 10 such that liquid entering the tray deck (floor) 18 is forced to contact the vertical tabs (walls) 17 in a near orthogonal manner. This contact with the tabs 17 will cause the fast moving clear liquid to spread outward and upward. This slows the liquid, making the liquid more receptive to infusion from the vapor from the downstream openings 21 in the bubbling area 20 of the tray deck 18. The vapor, moving essentially vertically, also serves to slow the horizontal liquid flow across the inlet side of the tray 10.

The alternating vertical tabs 17 also allow solids to migrate through the infusion field 15 and across the tray deck 18.

The tabs 17 may also be formed with varying heights so as to have a continuing effect on higher liquid rates.

The infusion field 15 functions to actually slow liquid flow onto the tray 10 so that vapor can be injected into the clear liquid stream in order to maximize vapor-liquid contact and maximize capacity by insuring equal vapor distribution to the active bubbling area 20 of the tray 10.

The infusion tab valves 16 are formed from the tray deck 18 itself and do not require any addition to the tray deck 18 other than what is formed by mechanically punching the valves 16 into the tray deck 18 itself. Alternatively, the tab valves 16 may be formed by adding a snap-in piece or by welding a piece at the orifice to form the tab 17.

Using the vapor momentum to form a vertical "curtain" to control the liquid momentum is a unique feature. Likewise, the field approach where the infusion tab valves 16 effectively scrub the liquid passing by is also unique.

The upturned tabs 17 of all the valves 16 form a semi-continuous inlet weir to control the liquid momentum leaving the inlet downcomer 13.

Figure 4:
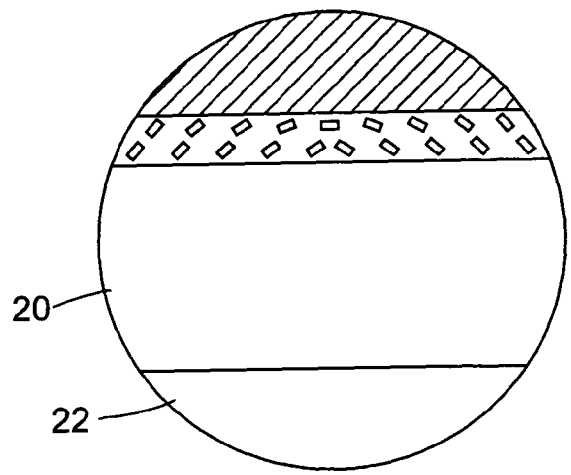
FIG. 4 illustrates a top view of a modified tray constructed in accordance with the invention.

Referring to FIG. 4, wherein like reference characters indicate like parts as above, the infusion tab valves 16 may be arranged with the orifices (openings) 19 in other than a parallel arrangement as in FIG. 2. As shown, the valves 16 are arranged in each row with the rectangular orifices 19 angularly disposed relative to each other and in a symmetric or mirror-image relation about the mid-point of the row.

Referring to FIG. 5, the openings 21 in the bubbling area 20 of the tray 10 may be formed by conventional V-grid holes in the tray deck 18 with each hole being formed by punching up without removing metal and with each hole being of trapezoidal shape having a greater width on the inlet side than on the outlet side. In this embodiment, four rows of infusion tab valves 16 are employed within the infusion field 15 and the inlet 14' is of arcuate shape and of a smaller cross-sectional area than the inlet 14 of the embodiment of FIG. 2.

Figure 6:
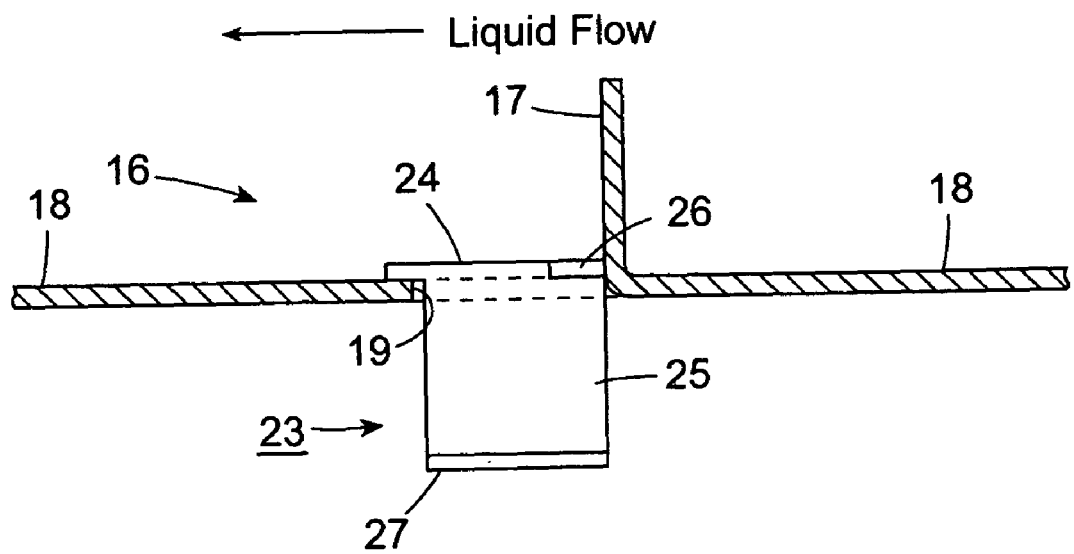
FIG. 6 illustrates a partial cross-sectional side view of an infusion tab valve with a push valve therein in accordance with the invention.
Figure 7:
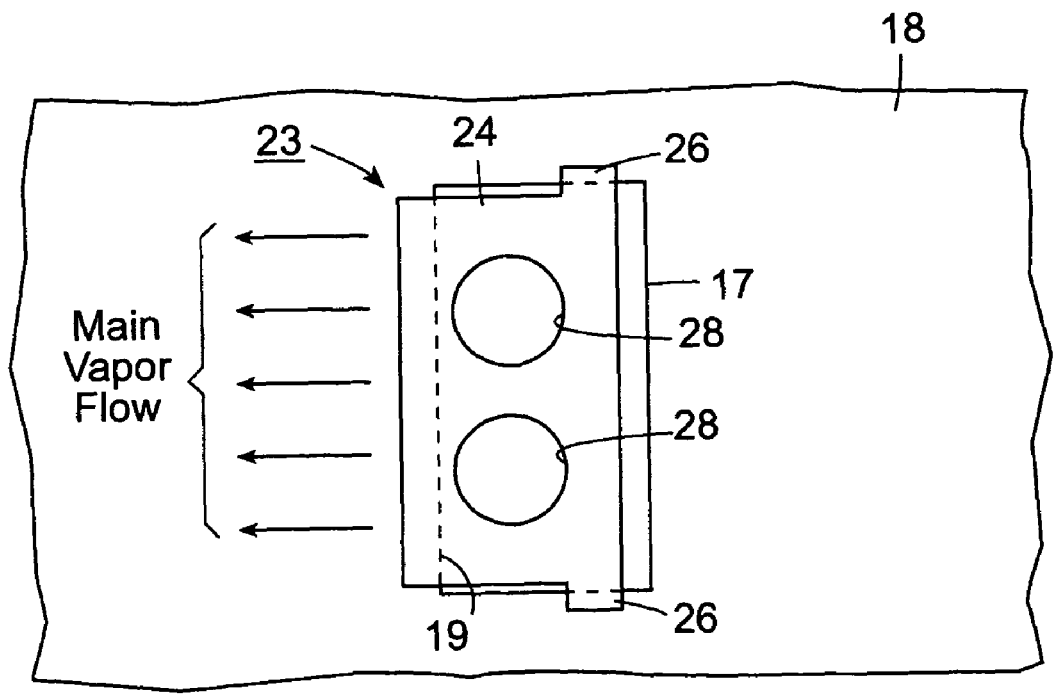
FIG. 7 illustrates a top view of the push valve and infusion tab valve of FIG. 6.

Referring to FIGS. 6 and 7, wherein like reference characters indicate like parts as above, each infusion tab valve 16 may also have a push valve 23 incorporated therein.

The push valve 23 includes a body that is moveably mounted within an orifice 19 of the infusion tab valve 16 in order to move between a closed position as viewed in FIG. 6 resting on the tray deck (floor) 18 and covering over the orifice (opening) 19 and an open position vertically spaced from the tray deck and the orifice to allow an ascending flow of vapor through the orifice 19.

The body includes a flat base 24, a pair of legs 25 that depend from opposite sides of the base 24 through the orifice 19 in the infusion tab valve 16 and a pair of flaps 26 that extend from opposite sides of the base 24 for resting on the tray floor 18 in the closed position. The flat base 24 has a rear portion that extends beyond the orifice 19 and legs 25 to rest on the deck 18 when in the closed position as shown.

Each leg 25 also has an outwardly extending foot 27 (see FIG. 6) for abutting an underside of the tray floor 18 in the open position. These feet 27 serve to limit the upward movement of the push valve 23 so that the base 24 does not extend past the plane of the tab 17 of the infusion tab valve 16.

As shown in FIG. 7, the flat base 24 may also have one or more orifices 28 therein for the passage of an ascending vapor. However, the push valve 23 is constructed so that the main vapor flow in the open position of the push valve 23 is parallel to the plane of the tray deck 18.

At low rates of vapor flow, the push valves 23 will be in the closed position providing only minimal froth promotion. At high rates of liquid flow, the push valves 23 will move upwardly to provide a passageway of vapor coming up from the tray below thereby providing froth injection and froth promotion, pushing for the liquid across the deck 18.

Providing the tray 10 with an infusion field 15 of tab valves 16 on the inlet side allows vapor to enter thereat so as to achieve a uniform vapor flow through the tray deck 18.

The infusion field of vapor infusing valves 16 serves to replace devices, such as froth promoters, inlet weirs, baffle bars, and the like. The valves 16 have a simple, robust design that is fouling resistant. This infusion field of valves 16 is not a continuous momentum breaker so the field 15 is definitely more fouling resistant than inlet weirs, continuous froth promoters, and baffle bars. Further, the valves 16 of the infusion field 15 have larger orifices 19 than a standard froth promoter and should be more fouling resistant.

The infusion field 15 will mitigate the momentum of liquid entering the tray deck 18 and allow quick aeration of the clear liquid with vapor from the tray deck 18. This will yield improvements in capacity and efficiency for the tray.

The infusion field 15 of the tray 10 is simple and strong and uses vapor to break some of the liquid momentum. The infusion tab valves 16 require no welding or assembly and can be implemented with a greater number of smaller devices when compared with typical froth promoter layouts so as to have a more uniform effect on the liquid flow.

The infusion field 15 has a higher open area than most froth promoter designs and should be more effective over a wider range of tower operations. In other words, the infusion field 15 will have a more proportional effect on the liquid as the rates increase (which is desirable).

The infusion field 15 allows the tray 10 to reach its optimum operating capability with a simpler, stronger, fouling resistant, cost effective device.

What is claimed is:

1. A tray comprising
an inlet for an inward flow of liquid:
a first portion defining an infusion field adjacent said inlet for receiving the flow of liquid and having at least two adjacent rows of infusion tab valves disposed therein to dissipate the momentum of the liquid flowing across said infusion field, each said valve including a horizontal floor of said tray, an opening in said floor for the passage of an ascending flow of vapor into contact with the liquid and a vertically upstanding wall adjacent said opening on a side closest to said inlet, said wall being of a height to obstruct a flow of liquid from said inlet cross said floor;
a second portion adjacent said first portion for receiving a liquid/vapor mixture flowing from said first portion, said second portion having a plurality of openings herein for the passage of an ascending flow of vapor into contact with the liquid/vapor mixture flowing across said second portion; and
an outlet adjacent said second portion and opposite said inlet for an outward flow of the liquid from said second portion.

2. A tray as set forth in claim 1 wherein said valves are disposed in parallel rows across said first portion with adjacent rows of said valves being disposed in staggered relation to each other to hydraulically obstruct the entire flow of liquid from said inlet.

3. A tray as set forth in claim 2 wherein each said valve in one of said rows of said valve has a rectangular shaped opening disposed in parallel to each valve in a other of said rows of said valves.

4. A tray as set forth in claim 2 wherein each said valve in one of said rows of said valves has a rectangular shaped opening disposed at an angle to another valve in said one of said rows of said valves.

5. A tray as set forth in claim 1 wherein each said valve includes a body movably mounted to move between a closed position resting on said floor and covering over said opening and an open position spaced from said floor and said opening to allow an ascending flow of vapor through said opening.

6. A tray as set forth in claim 5 wherein said body includes a flat base, a pair of legs depending from opposites sides of said base through said opening of said valve and a pair of flaps extending from said opposite sides of said base for resting on said floor in said closed position.

7. A tray as set forth in claim 6 wherein each said leg has an outwardly extending foot for abutting an underside of said floor in said open position.

8. A tray as set forth in claim 6 wherein said flat base has at least one orifice therein for the passage of an ascending vapor.

9. The combination comprising
a column disposed on a vertical axis;
a downcomer in said column for conveying a flow of liquid; and
a horizontally disposed tray in said column including an inlet for receiving a flow of liquid from said downcomer; a first portion defining an infusion field adjacent aid inlet for receiving the flow of liquid and having at least two adjacent rows of infusion tab valves disposed therein to dissipate the momentum of the liquid flowing across said infusion field, each said valve including a horizontal floor of said tray, an opening in said floor for the passage of an ascending flow of vapor into contact with the liquid and a vertically upstanding wall adjacent said opening on a side closest to said inlet, said wall being of a height to obstruct a flow of liquid from said inlet across said floor; a second portion adjacent said first portion for receiving a liquid/vapor mixture flowing from said first portion, said second portion having a plurality of openings therein for the passage an ascending flow of vapor into contact with the liquid/vapor mixture flowing across said second portion; and an outlet adjacent said second portion and opposite said inlet for an outward flow of the liquid from said second portion.

10. The combination as set forth in claim 9 further comprising a plurality of said trays disposed in vertically spaced relation within said column and a plurality of downcomers, each said downcomer connecting said outlet of each respective tray with a inlet of a respective tray therebelow.

11. The combination as set forth in claim 9 wherein said column has a circular cross-sectional shape and wherein said plurality of infusion tab valves extends across an entire chordal region of said column.

12. A tray comprising
an inlet for en inward flow of liquid;

a first portion defining an infusion field adjacent said inlet for receiving the flow of liquid and having a plurality of infusion tab valves disposed therein to dissipate the momentum of the liquid flowing across said infusion field, each said valve including a horizontal floor of said tray, an unobstructed opening in said floor for the passage of an ascending flow of vapor into contact with the liquid and a single vertically upstanding wall adjacent said opening on a side closest to said inlet to provide resistance to liquid flowing across said valve, said wall being of a height to obstruct a flow of liquid from said inlet across said floor;

a second portion adjacent said first portion for receiving a liquid/vapor mixture fixing from said first portion, said second portion having a plurality of openings therein for the passage of an ascending flow of vapor into contact with the liquid/vapor mixture flowing across said second portion; and an outlet adjacent said second portion and opposite said inlet for an outward flow of the liquid from said second portion.

13. A tray as set forth in claim 12 wherein said infusion tab valves are disposed in at least a parallel rows across said infusion field.

14. A tray as set forth in claim 12 wherein each said vertically upstanding wall is punched from said floor to define said opening of a respective valve.

* * * * *

UNITED STATES PATENT AND TRADEMARK OFFICE
CERTIFICATE OF CORRECTION

PATENT NO. : 7,708,258 B2  Page 1 of 1
APPLICATION NO. : 11/644386
DATED : May 4, 2010
INVENTOR(S) : Mark Pilling et al.

It is certified that error appears in the above-identified patent and that said Letters Patent is hereby corrected as shown below:

Column 5, line 60, "cross" should be -- across --
               line 64, "herein" should be -- therein --
    Column 6, line 39, "aid" should be -- said --
               last line, "en" should be -- an --
    Column 7, last line, "fixing" should be -- flowing --

Signed and Sealed this

Twenty-ninth Day of June, 2010

David J. Kappos
*Director of the United States Patent and Trademark Office*